US011899953B1

(12) United States Patent
Brewer (10) Patent No.: US 11,899,953 B1
(45) Date of Patent: Feb. 13, 2024

(54) METHOD OF EFFICIENTLY IDENTIFYING ROLLBACK REQUESTS

(71) Applicant: Micron Technology, Inc., Boise, ID (US)

(72) Inventor: Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/823,470

(22) Filed: Aug. 30, 2022

(51) Int. Cl.
G06F 3/06 (2006.01)
(52) U.S. Cl.
CPC .......... *G06F 3/0634* (2013.01); *G06F 3/0619* (2013.01); *G06F 3/0631* (2013.01); *G06F 3/0644* (2013.01); *G06F 3/0673* (2013.01)

(58) Field of Classification Search
None
See application file for complete search history.

(56) References Cited

U.S. PATENT DOCUMENTS

| 8,122,229 | B2 | 2/2012 | Wallach et al. |
| 8,156,307 | B2 | 4/2012 | Wallach et al. |
| 8,205,066 | B2 | 6/2012 | Brewer et al. |
| 8,423,745 | B1 | 4/2013 | Brewer |
| 8,561,037 | B2 | 10/2013 | Brewer et al. |
| 9,710,384 | B2 | 7/2017 | Wallach et al. |
| 10,990,391 | B2 | 4/2021 | Brewer |
| 10,990,392 | B2 | 4/2021 | Brewer |
| 2008/0270708 | A1 | 10/2008 | Warner et al. |
| 2012/0079177 | A1 | 3/2012 | Brewer et al. |
| 2013/0332711 | A1 | 12/2013 | Leidel et al. |
| 2015/0143350 | A1 | 5/2015 | Brewer |
| 2015/0206561 | A1 | 7/2015 | Brewer et al. |
| 2019/0042214 | A1 | 2/2019 | Brewer |
| 2019/0171604 | A1 | 6/2019 | Brewer |
| 2019/0243700 | A1 | 8/2019 | Brewer |
| 2019/0303154 | A1 | 10/2019 | Brewer |
| 2019/0324928 | A1 | 10/2019 | Brewer |
| 2019/0340019 | A1 | 11/2019 | Brewer |
| 2019/0340020 | A1 | 11/2019 | Brewer |
| 2019/0340023 | A1 | 11/2019 | Brewer |
| 2019/0340024 | A1 | 11/2019 | Brewer |
| 2019/0340027 | A1 | 11/2019 | Brewer |

(Continued)

FOREIGN PATENT DOCUMENTS

| WO | 2010051167 | 5/2010 |
| WO | 2013184380 | 12/2013 |

(Continued)

*Primary Examiner* — Kevin Verbrugge
(74) *Attorney, Agent, or Firm* — Schwegman Lundberg & Woessner, P.A.

(57) ABSTRACT

Disclosed in some examples are methods, systems, memory devices, and machine-readable mediums that allow a memory device to efficiently mark memory extents involved in an enhanced memory operation. An extent is marked if a meta state associated with the extent indicates that the extent is included in the enhanced memory operation. The largest memory extents of the operation are maintained in the memory device as a list of unmarked extents. When a primitive memory operation is received, the memory address is compared to the unmarked extents in the list to the meta state for that memory line. If the address is covered by the list of extents, or that line's meta state is marked, then the memory operation is performed including the enhanced memory operation.

20 Claims, 5 Drawing Sheets

(56) References Cited

U.S. PATENT DOCUMENTS

| | | |
|---|---|---|
| 2019/0340035 A1 | 11/2019 | Brewer |
| 2019/0340154 A1 | 11/2019 | Brewer |
| 2019/0340155 A1 | 11/2019 | Brewer |
| 2021/0055964 A1 | 2/2021 | Brewer |
| 2021/0064374 A1 | 3/2021 | Brewer |
| 2021/0064435 A1 | 3/2021 | Brewer |
| 2021/0149600 A1 | 5/2021 | Brewer |

FOREIGN PATENT DOCUMENTS

| | | |
|---|---|---|
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

|   | EXTENT START ADDRESS | EXTENT SIZE |
|---|---|---|
| 1 | | |
| | | |
| EXTENT ENTRIES | ⋮ | ⋮ |
| | | |
| N | | |

METHOD OF EFFICIENTLY IDENTIFYING ROLLBACK REQUESTS

GOVERNMENT RIGHTS

This invention was made with Government support under Agreement No. DE-AC05-76RL01830, awarded by the US Department of Energy. The Government has certain rights in the invention.

TECHNICAL FIELD

Embodiments of the disclosure relate generally to memory devices and more specifically to systems, devices, and methods that improve efficiency of memory rollback operations.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is a type of non-volatile memory that is characterized as byte addressable low latency memory. Examples of persistent memory may include Non-volatile Dynamic Inline Memory Modules (NVDIMM), phase-change memory, storage class memory, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The confluence of a number of factors such as an increase in speed (and decrease in latency) of memory devices such as storage class memory devices and other persistent memory devices in combination with their non-volatile properties, the increase in speed of computer busses (such as the Peripheral Component Interconnect Express (PCIe)), and other factors have led to the use of memory devices directly by other components of a computer system. For example, Compute Express Links (CXL) may allow storage of the memory device to be shared across multiple components. For example, a storage class memory device may be used by the CPU in a manner similar to how a CPU uses RANI. CXL enables the sharing of memory storage through the PCIe physical and electrical interface with new protocols that allow memory and cache coherence between components. Embodiments of the present disclosure are directed to enhanced memory operations (EMF) that can affect a large amount of data of a memory device that is shared by multiple components of a computer system. The amount of data affected can be in the range of tera-bytes.

An example of an enhanced memory operation is a memory rollback operation. Applications that interact with persistent memory may require that the data structures of the application be rolled back to a consistent state when an application, operating system, or hardware induced system crash occurs. A memory rollback operation starts with an application providing a list of one or more memory locations affected by the rollback. The memory state of those locations is saved until the application thread indicates that the memory rollback operation is complete, and the memory modifications should be committed, or that the memory modifications should be discarded. During the memory rollback operation, memory writes to a particular memory location in the list of one or more memory locations provided by the application are performed on a copy of the value and the original value is preserved. If the memory rollback operation is committed, then the copy becomes the correct value and may then be subsequently used in place of the original, or the value stored in the copy is copied to the original. If the memory rollback operation is abandoned, the copy is not preserved, and the value goes back to the original. Any memory blocks allocated for the memory rollback operation may then be reclaimed after the operation is either committed or aborted.

A memory region is a large contiguous range of physical addresses that is managed in hardware, such that all writes to the memory will preserve the prior contents of that range. Individual memory regions are assigned to an application or set of applications during the execution of the application or applications. Multiple individual memory regions can be combined to form larger pools of memory. A memory extent is a smaller contiguous range of physical addresses within a memory region that may be combined in a list (allowing for gaps between them). Extents represent software-requested memory objects that may be used during operations requiring memory rollback. Extents are aligned on 64 Byte (64B) boundaries.

An enhanced memory operation is initiated by providing a list of memory extents that the operation is to be performed on. An individual extent could cover a single memory line (64B) or a large multi-terabyte data base. Later when a primitive memory operation (64B read or write) occurs, it should be determined whether the memory line is within the set of previously identified memory extents of the enhanced memory operation. Traditionally, the method of performing this determination required that meta state associated with each memory line of the extent have an indication of whether the memory line was participating in the enhanced memory operation. When the enhanced memory operation was initiated, each participating memory line need to be marked. For a small sized extent this can be a quick operation. For very large sized extents this marking could be a very long duration operation.

Figure 1:
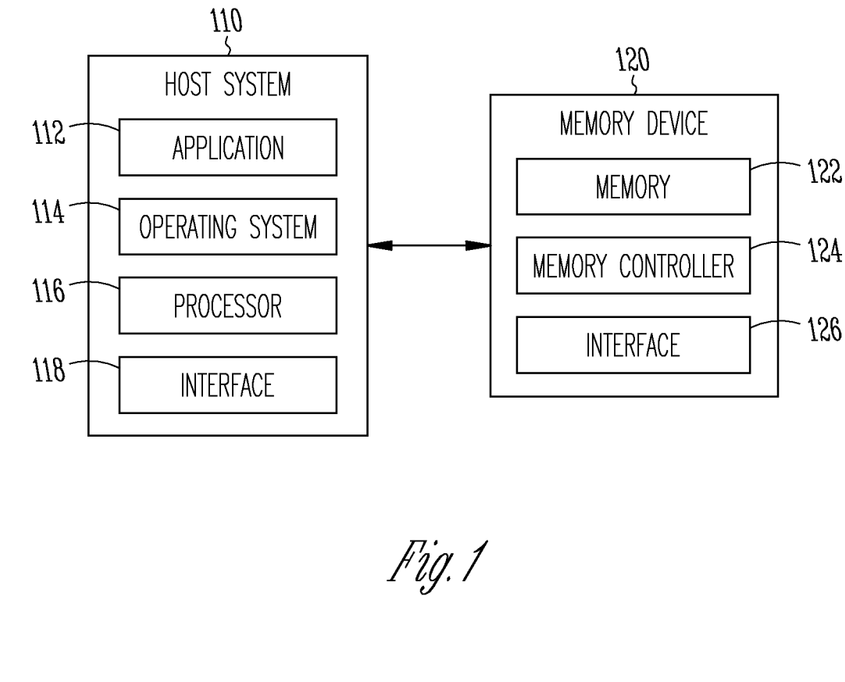
FIG. 1 illustrates an operating environment of a memory device, in accordance with some examples described herein.
Figure 5:
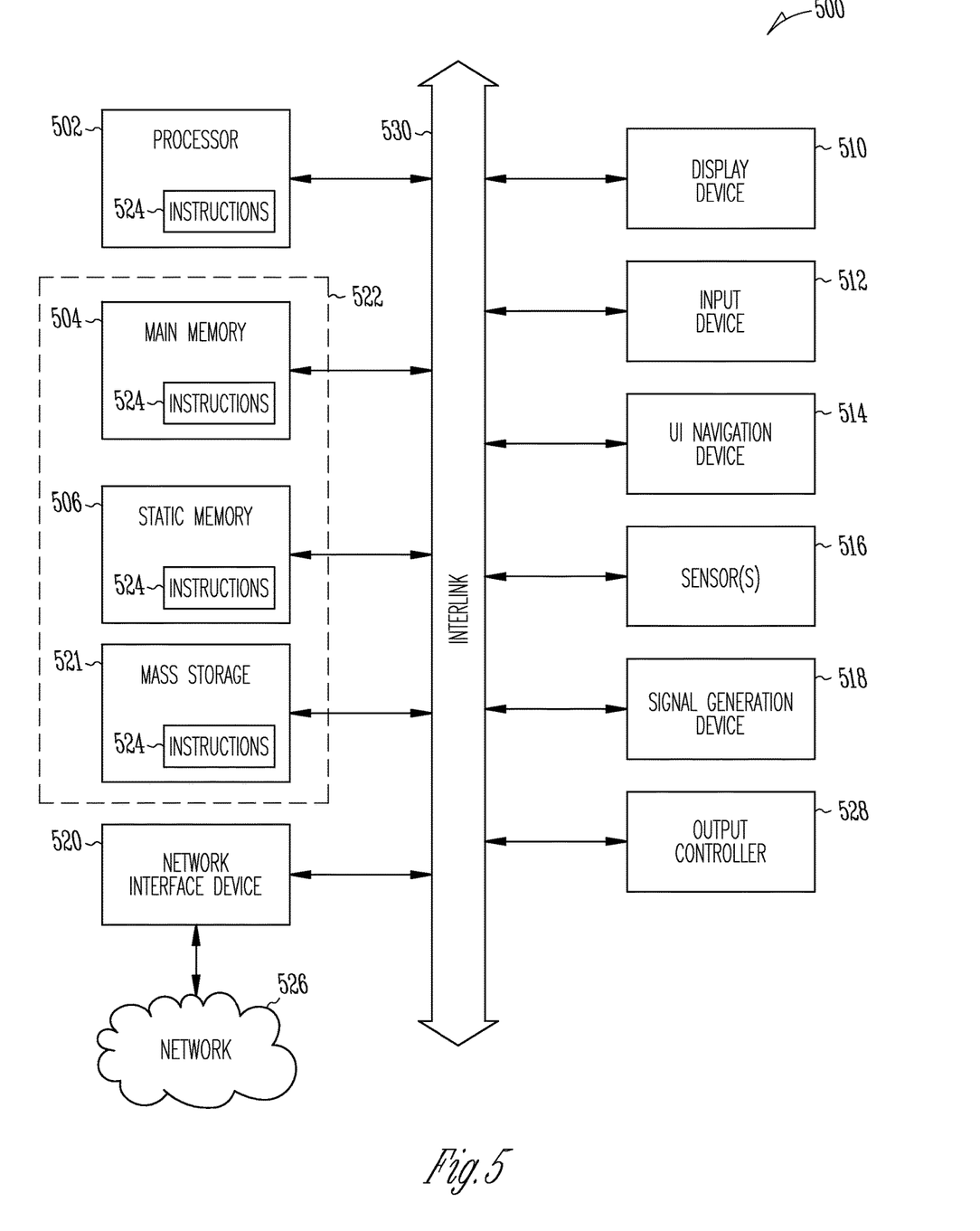
FIG. 5 is a block diagram illustrating an example of a machine upon which one or more embodiments may be implemented, in accordance with some examples described herein.

FIG. 1 illustrates an operating environment of a memory device 120 according to some examples of the present disclosure. Host system 110 may comprise, include components of, or be integrated into, a computing device, such as shown in FIG. 5. In some examples, the host system 110 may include a processor 116 (which may be an example of processor 502 of FIG. 5). The processor 116 may include one or more caches, such as L1, L2, and/or L3 cache. Operating system 114 may interface with hardware of the host system such as the processor 116 and may provide one or more application programming interfaces (APIs) for applications, such as application 112 to interface with the hardware. Application 112 may perform one or more functionalities using the hardware and resources provided by the operating system 114. Interfaces 118 and 126 may be or manage a physical interface and may include one or more software and/or protocol implementations. Example interfaces may include a PCIe interface, a Universal Serial Bus interface, and the like (e.g., the interfaces 118 and 126 may be implemented across a or interconnect such as interlink 508 of FIG. 5). Interfaces 118 and 126 may implement a PCIe interface, a CXL interface, and the like.

Memory device 120 may include memory 122, such as NAND storage, phase change memory, and the like. Memory 122 may be an example of main memory 504, static memory 506, or drive unit 516 of FIG. 5. Memory controller 124 may be or include one or more processing units that may manage the memory 122 (e.g., processor 502 of FIG. 5). Memory controller 124 may have volatile storage for storage of data and instructions (e.g., memory 504 of FIG. 5). As an example, the memory controller 124 may include one or more logical to physical mapping tables that converts logical addresses into physical addresses on the memory 122. Other examples may include other management functions with respect to memory 122, such as garbage collection, error correction, and the like. The host system 110 and memory device 120 may implement an interface, such as a standard PCIe interface, a CXL interface, or the like across a physical interface or buss, such as a PCIe interface. The host system 110 may maintain cache and/or memory coherency between the host system 110 and memory device 120.

An application, such as application 112 may create an enhanced memory operation. For example, the application may call a function provided by an operating system, such as operating system 114 and/or provided by the memory controller 124. In some examples, all memory in the memory device 120 may be used by an enhanced memory operation (e.g., a memory rollback operation). In other examples, only certain extents of memory that are marked as eligible may be used by the enhanced memory operation. The meta state of metadata associated with each memory line of the extents used by the enhanced memory operation is marked with an indication of whether the memory line is participating in the enhanced memory operation. In some examples, this marking is performed by a processor of the memory controller 124. In some examples, the marking of memory lines is performed in the background of the enhanced memory operation. The processor may implement a logic state machine to perform the background marking.

To reduce marking operations that are overly long, the memory controller 124 maintains a small list in memory of extents that are not marked in memory line meta state. When a primitive memory operation is processed, the memory address of the primitive operation is compared to the list of extents and to the meta state for that memory line. If the address is covered by the list of extents or the meta state of that memory line is marked, then the memory operation is performed including the enhanced memory operation.

Figure 2:
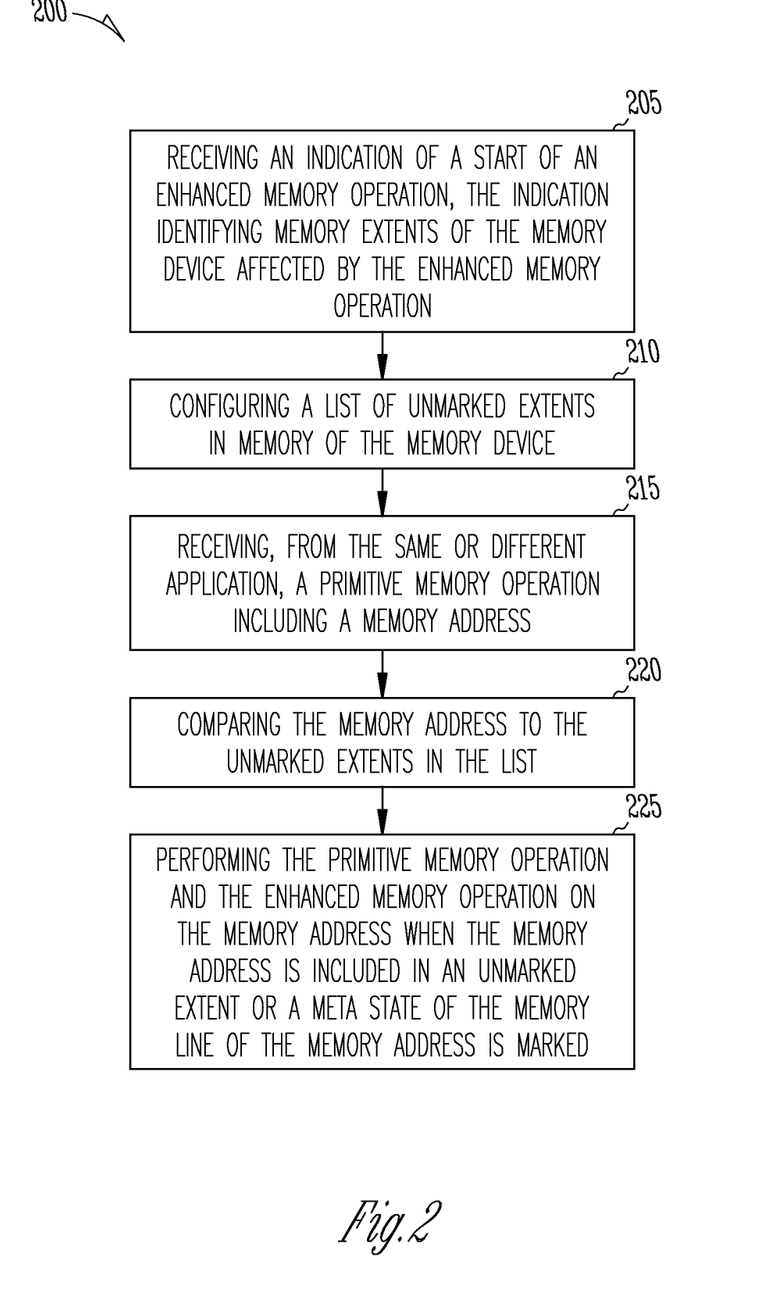
FIG. 2 is a flow diagram of an example of a method of operating a memory device, in accordance with some examples described herein.

FIG. 2 is a flow diagram of a method 200 of operating a memory device according to some examples of the present disclosure. The method 200 may be performed by an operating system of a host (e.g., operating system 114 of host system 110 in FIG. 1), a memory controller of the memory device (e.g., memory controller 124 of memory device 120 of FIG. 1), portions may be performed by the host and other portions may be performed by the memory controller of the memory device, or the like. The enhanced memory operation begins with a function call for the operation by an application.

At block 205, the memory controller of the memory device receives an indication of a start of the enhanced memory operation. The indication identifies memory extents of the memory device affected by the enhanced memory operation. The function call may validate the extents to ensure they are within memory regions that are configured to support the enhanced memory operation. If the extents are valid, then a unique enhanced memory operation identifier may be assigned, and the indication sent to the memory controller can include the enhanced memory operation identifier.

At block 210, the memory controller configures a list of unmarked extents in the memory of the memory device. The unmarked extents are not marked in memory line meta state. An extent is marked if meta state associated with the extent indicates that the extent is included in the enhanced memory operation. For example, each memory line of an extent involved in the enhanced memory operation may have five bits of associated metadata indicating the meta state of the memory line. For instance:

T (Tracking) bit—Indicates that memory line is currently participating in an enhanced memory operation.
W (Writeable) bit—Tracks if the memory line is in host cache in a writeable state.
F (First Write) bit—Tracks if a memory line has been written since the enhanced memory operation began.
S (Select) bit—Records the starting (original) location for the memory line at the beginning of the enhanced memory operation.
E (Error) bit—A read may return error (e.g., returns a CXL poison indication) to a requestor when this bit is set.

At block 215, a primitive memory operation is received from the same or different application. The primitive memory operation includes a memory address. At block 220 when the primitive memory operation is processed, the memory address is compared to the unmarked extents in the list. At block 225, if the memory address is covered by the list of unmarked extents, or the meta state for the memory line for that memory address is marked, then the primitive memory operation is performed including the enhanced memory operation.

Figure 3:
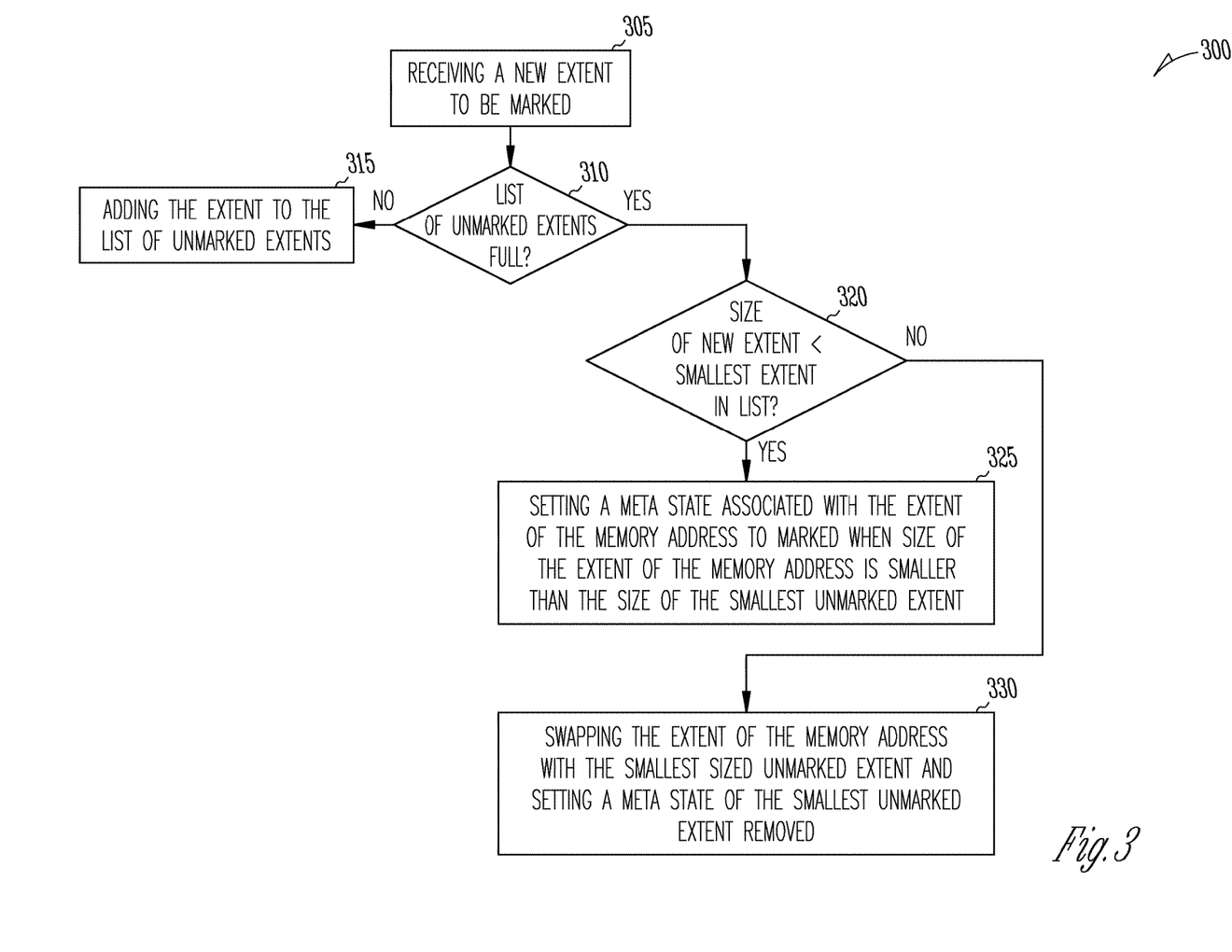
FIG. 3 is a flow diagram of an example of a method of forming a list of unmarked extents, in accordance with some examples described herein.

FIG. 3 is a flow diagram of an example of a method of forming a list of unmarked extents that are not marked in memory line meta state. This small list of extents is maintained in a manner that allows quick determination of the smallest extent within the list. At block 305, a new extent to be marked is received, and at block 310 it is determined if the list is full. The size of the list is predetermined (e.g., a fixed number of entries). At block 315, if the list of extents is not full, then the new extent (independent of the extent size) is entered into the list of extents.

At block 320, when the list of extents is full, the size of the new extent is compared to the size of the smallest extent currently in the list. If the size of the new extent is equal or smaller in size than the smallest extent currently in the list, then at 325 the new extent is marked using memory line meta state. If the size of the new extent is greater than the smallest extent currently in the list, at block 330 the new extent is swapped in the list of extents with the smallest list extent, and that smallest extent removed from the list is marked in memory line meta state.

Figure 4:
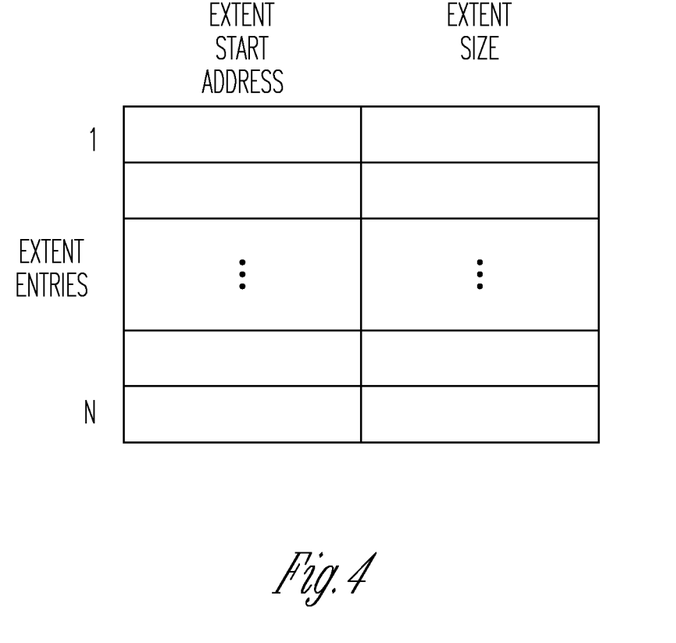
FIG. 4 is an example of a list of unmarked memory extents that are not marked in memory line meta state, in accordance with some examples described herein.

FIG. 4 is an example of a list of unmarked extents produced by the memory controller (e.g., by performing the method of FIG. 3). The list may be a table that includes the starting address of each unmarked extent and size of the extent. The list includes the largest extents and because the extents are unmarked, the marking operation does not include these largest extents. The large extents in the list can be marked using a background operation so that large extents are marked without burdening the enhanced memory operation itself.

The table or list enables efficient marking of memory lines participating in enhanced memory operation processing independent of the size of the memory extent. In some examples, the list of unmarked extents may be maintained in a sorted order for easy determination of the smallest extent entry in the list. In other examples, the list is left unsorted, and the determination of the smallest extent entry is determined by a comparison when the next extent insert candidate is received.

When the enhanced memory operation is completed, the extents for the operation should be removed from future processing. This removal process may be accomplished using the unmarked extent list. If the extent is in the list of unmarked extents, then the meta state associated with the extent list entry is marked as invalid. If the extent is not in the list of unmarked extents, then the meta state associated with each extent memory line is marked as no longer participating in an operation.

FIG. 5 illustrates a block diagram of an example machine 500 upon which any one or more of the techniques (e.g., methodologies) described herein may be performed. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine-readable media 522. While the machine-readable medium 522 is illustrated as a single medium, the term "machine readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non- transitory machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 may be representative of the instructions 524, such as instructions 524 themselves or a format from which the instructions 524 may be derived. This format from which the instructions 524 may be derived may include source code, encoded instructions (e.g., in compressed or encrypted form), packaged instructions (e.g., split into multiple packages), or the like. The information representative of the instructions 524 in the machine readable medium 522 may be processed by processing circuitry into the instructions to implement any of the operations discussed herein. For example, deriving the instructions 524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 may include assembly, compilation, or interpretation of the information (e.g., by the processing circuitry) to create the instructions 524 from some intermediate or preprocessed format provided by the machine readable medium 522. The information, when provided in multiple parts, may be combined, unpacked, and modified to create the instructions 524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software. A transmission medium is a machine readable medium.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure.

Example 1 includes subject matter (such as a method of operating a memory device) comprising receiving, from an application, an indication of a start of an enhanced memory operation, the indication identifying memory extents of the memory device affected by the enhanced memory operation; configuring a list of unmarked extents in memory of the memory device, wherein the list has a predetermined size, and an extent is marked if a meta state associated with the extent indicates that the extent is included in the enhanced memory operation; receiving, from the same or different application, a primitive memory operation including a memory address; comparing the memory address to the unmarked extents in the list; and performing the primitive memory operation and the enhanced memory operation on the memory address when the memory address is included in an unmarked extent or a meta state of the memory line of the memory address is marked.

In Example 2, the subject matter of Example 1 optionally includes adding an extent containing the memory address to the list of unmarked extents when the list of unmarked extents is not full. When the list of unmarked extents is full, comparing a size of the extent of the memory address to a size of a smallest unmarked extent in the list; setting a meta state associated with the extent of the memory address to marked when size of the extent of the memory address is smaller than the size of the smallest unmarked extent; and swapping the extent of the memory address with the smallest sized unmarked extent and setting a meta state of the smallest unmarked extent removed from the list to marked.

In Example 3, the subject matter of Example 2 optionally includes sorting the unmarked extents in the list according to size.

In Example 4, the subject matter of one or any combination of Examples 1-3 optionally includes the enhanced memory operation being a memory rollback operation, and the meta state indicating whether the extent is participating in the memory rollback operation.

In Example 5, the subject matter of one or any combination of Examples 1-4 optionally includes completing the enhanced memory operation; setting a meta state associated with an unmarked extent of the list to invalid; and setting a meta state associated with an extent not included in the list to indicate the extent is no longer participating in an enhanced memory operation.

In Example 6, the subject matter of one or any combination of Examples 1-5 optionally includes allocating a table of a predetermined number of table entries in the memory of the memory device, wherein a table entry includes an extent start address and extent size.

In Example 7, the subject matter of one or any combination of Examples 1-6 optionally includes marking extents not included in the list of unmarked extents using a background memory operation separate from the enhanced memory operation.

Example 8 includes subject matter (such as a memory device) or can optionally be combined with one or any combination of Examples 1-7 to include such subject matter, comprising a memory array including memory cells, and a memory controller operatively coupled to the memory array and including a processor. The processor configured to initiate an enhanced memory operation to the memory array; identify memory extents of the memory array affected by the enhanced memory operation; allocate a list of unmarked extents in the memory array, wherein the list has a predetermined size, and an extent is marked if a meta state associated with the extent indicates that the extent is included in the enhanced memory operation; receive a request for a primitive memory operation, wherein the primitive memory operation includes a memory address; compare the memory address to the unmarked extents in the list; and perform the primitive memory operation and the enhanced memory operation on the memory address when the memory address is included in an unmarked extent or a meta state of the memory line of the memory address is marked.

In Example 9, the subject matter of Example 8 optionally includes a processor configured to add an extent containing the memory address to the list of unmarked extents when the list of unmarked extents is not full. When the list of unmarked extents is full, the processor is configured to compare a size of the extent of the memory address to a size of a smallest unmarked extent in the list; set a meta state associated with the extent of the memory address to marked when size of the extent of the memory address is smaller than the size of the smallest unmarked extent; and swap the extent of the memory address with the smallest sized unmarked extent and set a meta state of the smallest unmarked extent removed from the list to marked.

In Example 10, the subject matter of one or both of Examples 8 and 9 optionally includes a processor configured to sort the unmarked extents in the list according to size.

In Example 11, the subject matter of one or any combination of Examples 8-10 optionally includes a processor configured to initiate a memory rollback operation and set a meta state of an extent to indicate that the extent is participating in the memory rollback operation.

In Example 12, the subject matter of one or any combination of Examples 8-11 optionally includes a processor configured to complete the enhanced memory operation; set a meta state associated with an unmarked extent of the list to invalid; and set a meta state associated with an extent not included in the list to indicate the extent is no longer participating in an enhanced memory operation.

In Example 13, the subject matter of one or any combination of Examples 8-12 optionally includes a processor configured to allocate a table of a predetermined number of table entries in the memory of the memory device, wherein a table entry includes an extent start address and extent size.

In Example 14, the subject matter of one or any combination of Examples 8-13 optionally includes a state machine implemented using the same or a different processor of the memory device, wherein the state machine is configured to mark extents not included in the list of unmarked extents using a background memory operation separate from the enhanced memory operation.

Example 15 includes subject matter, or can optionally be combined with one or any combination of Examples 1-14 to include such subject matter, comprising a computer readable medium including instructions that, when performed by processing circuitry of a memory controller, cause the memory controller to perform acts comprising: receiving, from an application, an indication of a start of an enhanced memory operation, the indication identifying memory extents of the memory device affected by the enhanced memory operation; configuring a list of unmarked extents in memory of the memory device, wherein the list has a predetermined size, and an extent is marked if a meta state associated with the extent indicates that the extent is included in the enhanced memory operation; receiving, from the same or different application, a primitive memory operation including a memory address; comparing the memory address to the unmarked extents in the list; and performing the primitive memory operation and the enhanced memory operation on the memory address when the memory address is included in an unmarked extent or a meta state of the memory line of the memory address is marked.

In example 16, the subject matter of claim 15 further includes instructions that cause the memory controller to perform acts including adding an extent containing the memory address to the list of unmarked extents when the list of unmarked extents is not full. When the list of unmarked extents is full, the instructions cause the memory controller to perform acts including: comparing a size of the extent of the memory address to a size of a smallest unmarked extent in the list; setting a meta state associated with the extent of the memory address to marked when size of the extent of the memory address is smaller than the size of the smallest unmarked extent; and swapping the extent of the memory address with the smallest sized unmarked extent and setting a meta state of the smallest unmarked extent removed from the list to marked.

In Example 17, the subject matter of one or both of Examples 15 and 16 optionally includes instructions that cause the memory controller to sort the unmarked extents in the list according to size.

In Example 18, the subject matter of one or any combination of Examples 15-17 optionally include includes instructions that cause the memory controller to perform a memory rollback operation, and to set the meta state to indicate that the extent is participating in the memory rollback operation.

In Example 19, the subject matter of any or any combination of Examples 15-18 optionally includes instructions that cause the memory controller to perform acts including completing the enhanced memory operation; setting a meta state associated with an unmarked extent of the list to invalid; and setting a meta state associated with an extent not included in the list to indicate the extent is no longer participating in an enhanced memory operation.

In Example 20, the subject matter of any or any combination of Examples 15-19 optionally includes instructions that cause the memory controller to perform acts including marking extents not included in the list of unmarked extents using a background memory operation separate from the enhanced memory operation.

These non-limiting Examples can be combined in any permutation or combination.

What is claimed is:

1. A method of operating a memory device, the method comprising:
   receiving, from an application, an indication of a start of an enhanced memory operation, the indication identifying memory extents of the memory device affected by the enhanced memory operation;
   configuring a list of unmarked extents in memory of the memory device, wherein the list has a predetermined size, and an extent is marked if a meta state associated with the extent indicates that the extent is included in the enhanced memory operation;
   receiving, from the same or different application, a primitive memory operation including a memory address;
   comparing the memory address to the unmarked extents in the list; and
   performing the primitive memory operation and the enhanced memory operation on the memory address when the memory address is included in an unmarked extent or a meta state of the memory line of the memory address is marked.

2. The method of claim 1, including:
   adding an extent containing the memory address to the list of unmarked extents when the list of unmarked extents is not full; and
   when the list of unmarked extents is full,
      comparing a size of the extent of the memory address to a size of a smallest unmarked extent in the list;
      setting a meta state associated with the extent of the memory address to marked when size of the extent of the memory address is smaller than the size of the smallest unmarked extent; and
      swapping the extent of the memory address with the smallest sized unmarked extent and setting a meta state of the smallest unmarked extent removed from the list to marked.

3. The method of claim 2, including sorting the unmarked extents in the list according to size.

4. The method of claim 1, wherein the enhanced memory operation is a memory rollback operation, and the meta state indicates whether the extent is participating in the memory rollback operation.

5. The method of claim 1, including:
   completing the enhanced memory operation;
   setting a meta state associated with an unmarked extent of the list to invalid; and
   setting a meta state associated with an extent not included in the list to indicate the extent is no longer participating in an enhanced memory operation.

6. The method of claim 1, wherein configuring the list of unmarked events includes:
   allocating a table of a predetermined number of table entries in the memory of the memory device, wherein a table entry includes an extent start address and extent size.

7. The method of claim 1, including marking extents not included in the list of unmarked extents using a background memory operation separate from the enhanced memory operation.

8. A memory device comprising:
   a memory array including memory cells;
   a memory controller operatively coupled to the memory array and including a processor, the processor configured to:
      initiate an enhanced memory operation to the memory array;
      identify memory extents of the memory array affected by the enhanced memory operation;
      allocate a list of unmarked extents in the memory array, wherein the list has a predetermined size, and an extent is marked if a meta state associated with the extent indicates that the extent is included in the enhanced memory operation;
      receive a request for a primitive memory operation, wherein the primitive memory operation includes a memory address;
      compare the memory address to the unmarked extents in the list; and
      perform the primitive memory operation and the enhanced memory operation on the memory address when the memory address is included in an unmarked extent or a meta state of the memory line of the memory address is marked.

9. The memory device of claim 8, wherein the processor is configured to:
   add an extent containing the memory address to the list of unmarked extents when the list of unmarked extents is not full; and
   when the list of unmarked extents is full,
      compare a size of the extent of the memory address to a size of a smallest unmarked extent in the list;
      set a meta state associated with the extent of the memory address to marked when size of the extent of the memory address is smaller than the size of the smallest unmarked extent; and
      swap the extent of the memory address with the smallest sized unmarked extent and set a meta state of the smallest unmarked extent removed from the list to marked.

10. The memory device of claim 8, wherein the processor is configured to sort the unmarked extents in the list according to size.

11. The memory device of claim 8, wherein the processor is configured to initiate a memory rollback operation and set a meta state of an extent to indicate that the extent is participating in the memory rollback operation.

12. The memory device of claim 8, wherein the processor is configured to:
   complete the enhanced memory operation;
   set a meta state associated with an unmarked extent of the list to invalid; and
   set a meta state associated with an extent not included in the list to indicate the extent is no longer participating in an enhanced memory operation.

13. The memory device of claim 8, wherein the processor is configured to allocate a table of a predetermined number of table entries in the memory of the memory device, wherein a table entry includes an extent start address and extent size.

14. The memory device of claim 8, including a state machine implemented using the same or a different processor of the memory device, wherein the state machine is configured to mark extents not included in the list of unmarked extents using a background memory operation separate from the enhanced memory operation.

15. A non-transitory computer readable medium including instructions that, when performed by processing circuitry of a memory controller, cause the memory controller to perform acts comprising:
receiving, from an application, an indication of a start of an enhanced memory operation, the indication identifying memory extents of the memory device affected by the enhanced memory operation;
configuring a list of unmarked extents in memory of the memory device, wherein the list has a predetermined size, and an extent is marked if a meta state associated with the extent indicates that the extent is included in the enhanced memory operation;
receiving, from the same or different application, a primitive memory operation including a memory address;
comparing the memory address to the unmarked extents in the list; and
performing the primitive memory operation and the enhanced memory operation on the memory address when the memory address is included in an unmarked extent or a meta state of the memory line of the memory address is marked.

16. The non-transitory computer readable medium of claim 15, including instructions that cause the memory controller to perform acts including:
adding an extent containing the memory address to the list of unmarked extents when the list of unmarked extents is not full; and
when the list of unmarked extents is full,
comparing a size of the extent of the memory address to a size of a smallest unmarked extent in the list;
setting a meta state associated with the extent of the memory address to marked when size of the extent of the memory address is smaller than the size of the smallest unmarked extent; and
swapping the extent of the memory address with the smallest sized unmarked extent and setting a meta state of the smallest unmarked extent removed from the list to marked.

17. The non-transitory computer readable medium of claim 15, including instructions that cause the memory controller to perform acts including sorting the unmarked extents in the list according to size.

18. The non-transitory computer readable medium of claim 15, including instructions that cause the memory controller to perform a memory rollback operation, and set the meta state to indicate that the extent is participating in the memory rollback operation.

19. The non-transitory computer readable medium of claim 15, including instructions that cause the memory controller to perform acts including:
completing the enhanced memory operation;
setting a meta state associated with an unmarked extent of the list to invalid; and
setting a meta state associated with an extent not included in the list to indicate the extent is no longer participating in an enhanced memory operation.

20. The non-transitory computer readable medium of claim 15, including instructions that cause the memory controller to perform acts including marking extents not included in the list of unmarked extents using a background memory operation separate from the enhanced memory operation.

* * * * *